(12) United States Patent  
Shibue et al.

(10) Patent No.: US 8,435,645 B2  
(45) Date of Patent: May 7, 2013

(54) DIELECTRIC DEVICE AND METHOD OF MANUFACTURING DIELECTRIC DEVICE

(75) Inventors: Akira Shibue, Tokyo (JP); Tomohiko Kato, Tokyo (JP); Shinichiro Kakei, Tokyo (JP); Yasunobu Oikawa, Tokyo (JP); Kenji Horino, Tokyo (JP)

(73) Assignee: TDK Corporation, Tokyo (JP)

( * ) Notice: Subject to any disclaimer, the term of this patent is extended or adjusted under 35 U.S.C. 154(b) by 168 days.

(21) Appl. No.: 12/727,546

(22) Filed: Mar. 19, 2010

(65) Prior Publication Data

US 2010/0260981 A1     Oct. 14, 2010

(30) Foreign Application Priority Data

Mar. 25, 2009   (JP) ............................... P2009-074419

(51) Int. Cl.
    *B32B 15/00*         (2006.01)
    *H01G 4/008*        (2006.01)

(52) U.S. Cl.
    USPC ........... 428/615; 428/618; 428/621; 428/628; 428/629; 428/680; 361/314; 361/315

(58) Field of Classification Search ............... 361/321.1, 361/314, 315; 428/615, 618, 621, 628, 629, 428/680

See application file for complete search history.

(56) References Cited

U.S. PATENT DOCUMENTS

| | | | |
|---|---|---|---|
| 7,713,877 B2 | 5/2010 | Miyamoto et al. | |
| 7,808,769 B2 * | 10/2010 | Katoh et al. | ................... 361/305 |
| 2010/0323097 A1 | 12/2010 | Katoh et al. | |

FOREIGN PATENT DOCUMENTS

| | | |
|---|---|---|
| JP | A 2007-66754 | 3/2007 |
| JP | A 2007-194592 | 8/2007 |
| JP | A-2007-242880 | 9/2007 |

* cited by examiner

*Primary Examiner* — Cathy Lam

(74) *Attorney, Agent, or Firm* — Oliff & Berridge, PLC

(57) ABSTRACT

A dielectric device comprises a substrate made of a metal and an oxide dielectric layer mounted on a surface of the substrate. The surface of the substrate has metal oxide regions distributed like islands, while the oxide dielectric layer is in close contact with the substrate through the metal oxide regions. Since adhesion is higher in an area where the substrate and the oxide dielectric layer are in close contact with each other through the metal oxide regions distributed like islands on the surface of the substrate, the adhesion between the substrate and oxide dielectric layer in the dielectric device is enhanced. As compared with a case where a rough surface is formed on a metal foil, the metal oxide region and the substrate are inhibited from forming a rough surface, whereby leakage characteristics can be kept from being deteriorated by the rough surface.

8 Claims, 6 Drawing Sheets

(A)

(B)

(C)

DIELECTRIC DEVICE AND METHOD OF MANUFACTURING DIELECTRIC DEVICE

BACKGROUND OF THE INVENTION

1. Field of the Invention

The present invention relates to a dielectric device and a method of manufacturing a dielectric device.

2. Related Background Art

It has conventionally been known that, when making a thin-film capacitor as a dielectric device in which an oxide dielectric layer is formed on a substrate made of a metal foil, the adhesion at their interface is likely to become weaker. Various methods for enhancing the adhesion at the interface have been considered. A known example is a structure in which a rough surface is formed on the metal foil, so that the adhesion is enhanced by an anchor effect caused by the rough surface (see, for example, Japanese Patent Application Laid-Open No. 2007-242880).

SUMMARY OF THE INVENTION

The structure having a rough surface disposed on the metal foil as mentioned above, however, requires the step of forming the rough surface, which may complicate the operation. Also, the dielectric thin film mounted on the metal foil is so thin that there is a fear of the rough surface deteriorating leakage characteristics.

In view of the foregoing, it is an object of the present invention to provide a dielectric device which enhances the adhesion at an interface between a substrate made of a metal and an oxide dielectric layer while having a favorable leakage characteristic, and a manufacturing method which can make the dielectric device more easily.

For achieving the above-mentioned object, one aspect of the present invention provides a dielectric device comprising a substrate made of a metal and an oxide dielectric layer mounted on a surface of the substrate, wherein the surface of the substrate has a metal oxide region distributed like an island, while the oxide dielectric layer is in close contact with the substrate through the metal oxide region.

Since the adhesion is higher in an area where the substrate and the oxide dielectric layer are in close contact with each other through the metal oxide region distributed like an island than in an area where a metal part of the substrate and the oxide dielectric layer are in contact with each other, the adhesion between the substrate and oxide dielectric layer is enhanced in this dielectric device. As compared with the case where a rough surface is formed on the metal foil, the metal oxide region and the substrate are inhibited from forming a rough surface, whereby leakage characteristics can be kept from being deteriorated by the rough surface.

The dielectric device in accordance with the present invention may be embodied such that the metal oxide region is formed by oxidizing the metal constituting the substrate.

When the substrate and the metal oxide region are constituted by the same kind of metals, the adhesion between the substrate and metal oxide region becomes higher than that in the case where they are made of different kinds of metals, thereby improving the durability of the oxide dielectric layer under such a load as to peel it off. Therefore, the dielectric device as a whole further enhances the adhesion between the substrate and oxide dielectric layer.

Preferably, letting $S1$ be the area of an interface between the metal oxide region and oxide dielectric layer, and $S0$ be the area of an interface between the substrate and oxide dielectric layer, the ratio of $S1$ to $S0$ is 2 to 40% in the dielectric device in accordance with the present invention.

When the area of the interface between the metal oxide region and oxide dielectric layer falls within the range mentioned above, the adhesion between the substrate of the dielectric layer and oxide dielectric layer can be enhanced in a state where the decrease in capacitance density due to the metal oxide is suppressed.

One aspect of the present invention also provides a method of manufacturing a dielectric device comprising a laminating step of forming a multilayer body having an oxide dielectric layer mounted on a surface of a substrate made of a metal; and a metal oxide region forming step of oxidizing a partial area on the surface of the substrate in an interface between the substrate and oxide dielectric layer, so as to form a metal oxide region distributed like an island.

Since the step of forming the metal oxide region is carried out after mounting the oxide dielectric layer on the substrate, the above-mentioned method of manufacturing a dielectric device needs no operation for providing a new layer when laminating individual layers of the dielectric device and thus can more easily make a dielectric device in which the adhesion at the interface between the substrate and oxide dielectric layer is enhanced.

In a specific structure which can more effectively yield the advantageous effects mentioned above, the metal oxide region forming step has a first step of heat-treating the multilayer body in the air and a second step of heat-treating the multilayer body in a vacuum atmosphere after the first step.

The present invention provides a dielectric device which enhances the adhesion at an interface between a substrate made of a metal and an oxide dielectric layer while having a favorable leakage characteristic, and a manufacturing method which can make the dielectric device more easily.

DESCRIPTION OF THE PREFERRED EMBODIMENTS

In the following, best modes for carrying out the present invention will be explained in detail with reference to the accompanying drawings. In the explanation of the drawings, the same or similar constituents will be referred to with the same signs while omitting their overlapping descriptions.

Dielectric Device

Figure 1:
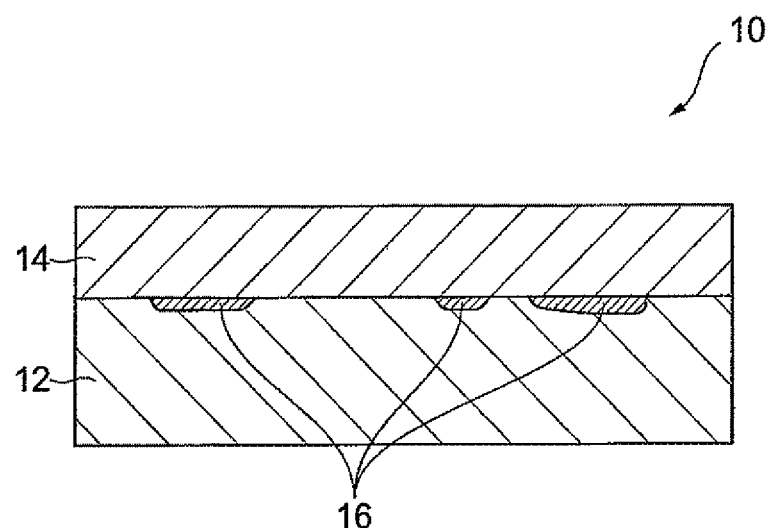
FIG. 1 is a sectional view of a dielectric device 10 in accordance with an embodiment.

FIG. 1 is a sectional view of a dielectric device 10 in accordance with a preferred embodiment of the present invention. As illustrated in FIG. 1, the dielectric device 10 includes a substrate 12 made of a metal, an oxide dielectric layer 14 mounted on the upper side of the substrate 12, and metal oxide regions 16 distributed like islands on a surface of the substrate 12.

The substrate 12 is preferably made of a foil of nickel (Ni), copper (Cu), or platinum (Pt) or a metal foil mainly composed of at least one of these metals, an Ni foil in particular. Nickel alloys such as nickel-phosphorus (NiP) alloys and nickel-chromium (NiCr) alloys, copper alloys, and the like can also be used. The substrate 12 mainly composed of nickel (Ni) may further contain at least one species selected from the group consisting of phosphorus (P), platinum (Pt), palladium (Pd), iridium (Ir), rhodium (Rh), ruthenium (Ru), osmium (Os), rhenium (Re), tungsten (W), chromium (Cr), tantalum (Ta), and silver (Ag). The substrate 12 mainly composed of copper (Cu) may contain at least one species selected from the group consisting of platinum (Pt), palladium (Pd), iridium (Ir), rhodium (Rh), ruthenium (Ru), osmium (Os), rhenium (Re), tungsten (W), chromium (Cr), tantalum (Ta), and silver (Ag).

The thickness of the substrate 12, which is selected as appropriate according to the use of the dielectric device 10, is preferably 5 to 10 μm, more preferably 20 to 70 μm, further preferably about 30 to 50 μm, when making a thin-film capacitor. When the substrate 12 is too thin, it tends to be harder to handle during the making of the dielectric device 10. The substrate 12 has an area of about 1×0.5 mm², for example.

The oxide dielectric layer 14 has a perovskite structure expressed by the chemical formula of $ABO_3$, where it will be preferred if A includes at least one element of barium (Ba), strontium (Sr), and calcium (Ca), and B includes at least one element of titanium (Ti), zirconium (Zr), and hafnium (Hf). The oxide dielectric layer 14 may further contain an additive substance as an auxiliary component in order to control its characteristics.

The thickness of the oxide dielectric layer 14 is 10 to 1000 nm, for example. The area of the oxide dielectric layer 14 is about 0.95×0.45 mm², for example.

Figure 2:
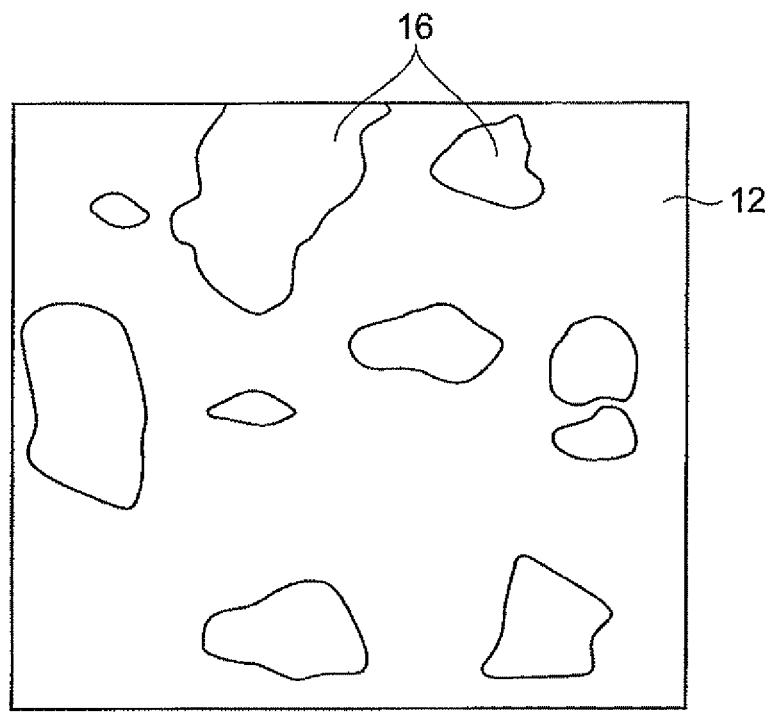
FIG. 2 is a view explaining a surface of a substrate 12 in the dielectric device 10 in accordance with the embodiment.

The metal oxide regions 16 will now be explained with reference to FIGS. 1 and 2. FIG. 2 is a view explaining a surface of the substrate 12 in the dielectric device 10. As illustrated in FIG. 2, the surface of the substrate 12 is dotted with surface parts of the metal oxide regions 16 which look like islands. As illustrated in FIG. 1, the metal oxide regions 16 are formed such as to infiltrate into the substrate 12 from the surface thereof, so that the surfaces of the metal oxide regions 16 are included in the surface of the substrate 12. The oxide dielectric layer 14 of the dielectric device 10 is in close contact with the substrate 12 through the metal oxide regions 16.

In thus constructed dielectric device 10, the adhesion of an area where the substrate 12 and the oxide dielectric layer 14 are in close contact with each other through the metal oxide region 16 is higher than that in an area where a metal part of the substrate 12 and the oxide dielectric layer 14 are in contact with each other. The reason therefor is not completely clear, but the adhesion seems to become higher when the oxide dielectric layer 14 made of an oxide and the metal oxide region 16 made of a metal oxide come into contact with each other, since both of them are oxides. In particular, a junction interface between oxides seems to be easier to produce a junction layer in the second step in which the multilayer body is heat-treated in a vacuum. The fact that a part of the surface of the substrate 12 thus constitutes the surface parts of the metal oxide regions 16 enhances the adhesion between the substrate 12 and oxide dielectric layer 14. Since the metal oxide regions 16 are arranged like islands, the decrease in capacity due to the metal oxide regions 16 is suppressed, whereby electric characteristics can be inhibited from deteriorating.

A structure in which the surface of the substrate 12 includes the surface parts of the metal oxide regions 16 as mentioned above makes the surface of the substrate 12 smoother than that in the case where a rough surface is formed on a substrate made of a metal foil, whereby leakage characteristics can be kept from being deteriorated by the rough surface on the substrate.

It will be preferred in particular if the metal oxide regions 16 distributed like islands on the surface of the substrate 12 are made of an oxide of a metal contained in the substrate 12. When the substrate 12 is an Ni foil, for example, it will be preferred if the metal oxide regions 16 are made of nickel oxide. Preferably, the metal oxide regions 16 are formed by oxidizing a metal contained in the substrate 12. When the metal contained in the substrate 12 and the metal of the metal oxide regions 16 are of the same kind, while the metal oxide regions 16 are formed by oxidizing the metal contained in the substrate 12, the durability of the substrate 12 and oxide dielectric layer 14 under such a load as to peel off from each other improves, whereby the dielectric device 10 with a higher adhesion can be obtained. When the substrate 12 is mainly composed of an alloy, it will be preferred if the metal oxide regions 16 are made of an oxide of any of metals constituting the alloy.

Letting S1 be the area of the interfaces between the metal oxide regions 16 and oxide dielectric layer 14 (i.e., the area of the metal oxide regions 16 in FIG. 2), and S0 be the area of the interface between the substrate 12 and oxide dielectric layer 14 (i.e., the sum of the area of metal parts of the substrate 12 indicated by the substrate 12 in FIG. 2 and the area of the metal oxide regions 16), the ratio of S1 to S0 is preferably 2 to 40%. When the ratio is less than 2%, the effect of enhancing the adhesion produced by the metal oxide regions 16 existing on the surface may become insufficient. When the ratio exceeds 40%, there is a possibility of dielectric loss due to the metal oxide regions 16 increasing. The areas S1 and S0 can be determined by observation through an. SEM (Scanning Electron Microscope) or the like after removing the oxide dielectric layer 14 from the dielectric device 10.

While this embodiment explains the dielectric device 10 in which the oxide dielectric layer 14 is mounted on the surface of the substrate 12, the structure of the dielectric device 10 in which the surface parts of the island-like metal oxide regions 16 are formed on the surface of the substrate 12 as in the present invention is applicable to various devices and favorably used in thin-film devices such as thin-film capacitors in particular. Specifically, for example, laminating a plurality of inner electrodes and a plurality of oxide dielectric layers alternately on the upper face of the oxide dielectric layer 14 in the dielectric device 10 and placing an upper electrode on the upper side thereof can manufacture a thin-film capacitor or the like. The structure in which the substrate 12 and oxide dielectric layer 14 are in close contact with each other through the metal oxide regions 16 can enhance the adhesion at the interface between the substrate 12 and oxide dielectric layer 14 in this case as well. A thin-film capacitor equipped with the inner electrodes as mentioned above can also enhance the adhesion between the inner electrodes and oxide dielectric layer by employing metal oxide regions distributed like islands on surfaces of a plurality of inner electrodes (i.e., their interfaces with the oxide dielectric layers).

Method of Manufacturing Dielectric Device

Figure 3:
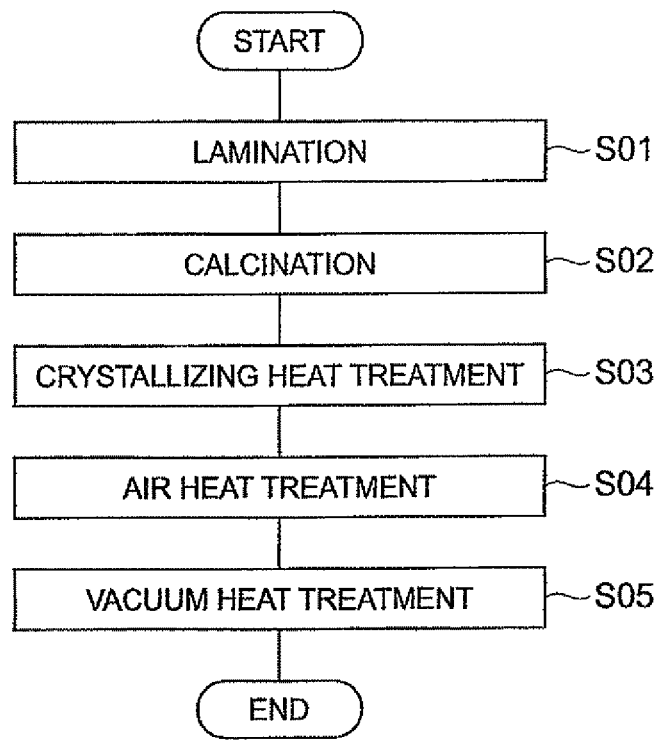
FIG. 3 is a sequence chart explaining a method of manufacturing the dielectric device 10 in accordance with the embodiment.
Figure 4:
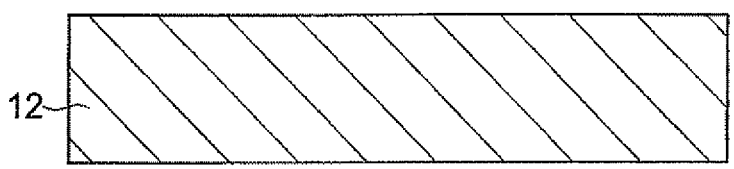
FIG. 4 is a sectional view explaining the method of manufacturing the dielectric device 10 in accordance with the embodiment.
Figure 4:
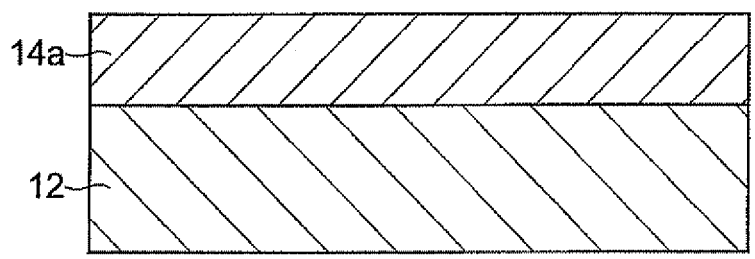
Figure 4:
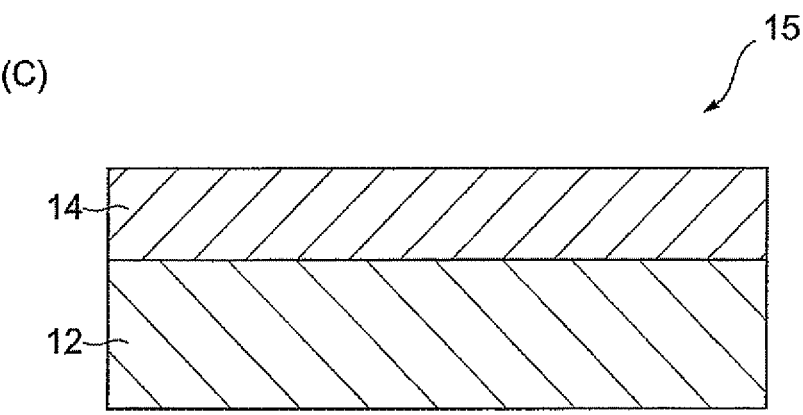

A method of manufacturing the dielectric device 10 in accordance with this embodiment will now be explained with reference to FIGS. 3 and 4. FIG. 3 is a sequence chart explaining the method of manufacturing the dielectric device 10, while FIG. 4 is a sectional view explaining the method of manufacturing the dielectric device 10.

First, the substrate 12 made of a metal is prepared (FIG. 4(A)). Here, the surface of the substrate 12 may be polished by a method such as CMP (Chemical Mechanical Polishing), electrolytic polishing, or buffing if necessary. Subsequently, as illustrated in FIG. 4(B), a dielectric film 14a to become the oxide dielectric layer 14 is formed on the substrate 12 (S01: laminating step). The dielectric film 14a can be formed by not only solution techniques but also various film-forming techniques such as PVD (Physical Vapor Deposition), e.g., sputtering, and CVD (Chemical Vapor Deposition). It will be sufficient if the composition of the dielectric film is similar to that of the oxide dielectric layer 14 of the finished dielectric device 10. The thickness of the dielectric film 14a can be adjusted by changing conditions under which the dielectric film 14a is formed. For example, when applying a solution to become the dielectric film 14a by spin coating, the thickness can be regulated by the concentration of the solution, the rotating speed, and the like.

Next, the substrate 12 having the dielectric film 14a formed thereon is calcined, so as to decompose organic components (S02: laminating step). The calcination is carried out by heat treatment in the air at 340 to 380° C. for 5 to 30 min, for example. Subsequently, the dielectric film 14a having decomposed the organic components is crystallized by firing, so as to form the oxide dielectric layer 14 (S03: laminating step). Preferably, the firing temperature is a temperature at which the dielectric film 14a is sintered (crystallized), specifically 500 to 1000° C. The firing tin e is about 5 min to 2 hr. The atmosphere during firing may be any of reducing, inert gas, and vacuum atmospheres. After laminating the dielectric film (S01), the calcination (S02) and crystallizing heat treatment (S03) are carried out, whereby a multilayer body 15 having the oxide dielectric layer 14 formed on the surface of the substrate 12 is obtained (FIG. 4(C)). The sequence of the lamination (S01) to crystallizing heat treatment (803) mentioned above may be repeated as necessary, so as to change (increase) the thickness of the oxide dielectric layer 14.

Subsequently, the multilayer body 15 is heat-treated in the air (S04: metal oxide region forming step (first step)). The condition for the heat-treatment in the air varies depending on the thickness of the oxide dielectric layer 14, the number of such layers, and the like. When there is only one oxide dielectric layer 14 and its thickness is 300 µm, for example, the heat treatment is preferably carried out for 5 to 60 min in the atmosphere heated at 380 to 460° C. The multilayer body 15 heat-treated in the air is then heat-treated in a vacuum atmosphere (S05: metal oxide region forming step (second step)). The vacuum atmosphere at this time is preferably at $10^{-3}$ Pa or less. Preferably, the heating temperature falls within the range of 500 to 1000° C., while the heating time is about 5 to 60 min. Such a condition oxidizes partial areas on the surface of the substrate 12 in the multilayer body 15, thereby forming the metal oxide regions 16 as illustrated in FIGS. 1 and 2. The foregoing steps yield the dielectric device 10 equipped with the metal oxide regions 16.

A device (e.g., a thin-film capacitor) having a plurality of oxide dielectric layers or the like may be made by forming the oxide dielectric layer 14 on the substrate 12 by the sequence of the lamination (S01) to crystallizing heat treatment (S03), carrying out the processing for forming the metal oxide regions (S04 and S05), and then laminating the upper dielectric layers, or laminating all the upper dielectric layers by repeating the sequence of the lamination (S01) to crystallizing heat treatment (S03) and then carrying out the processing for forming the metal oxide regions (S04 and S05).

The above-mentioned method of manufacturing the dielectric device 10 laminates the oxide dielectric layer 14 on the substrate 12 and then performs a step for forming the metal oxide regions 16. Since the newly performed step is constituted by the heat treatment in the air and the heat treatment in a vacuum atmosphere, there is no need for such an operation as to provide the multilayer body 15 with another layer, whereby the metal oxide regions 16 can be made by simpler operations, which makes it easier to attain the dielectric device 10 in which the adhesion at the interface between the substrate 12 and oxide dielectric layer 14 is enhanced.

Though a preferred embodiment of the present invention is explained in the foregoing, the present invention can be modified in various ways without being restricted to the above-mentioned embodiment.

Figure 5:
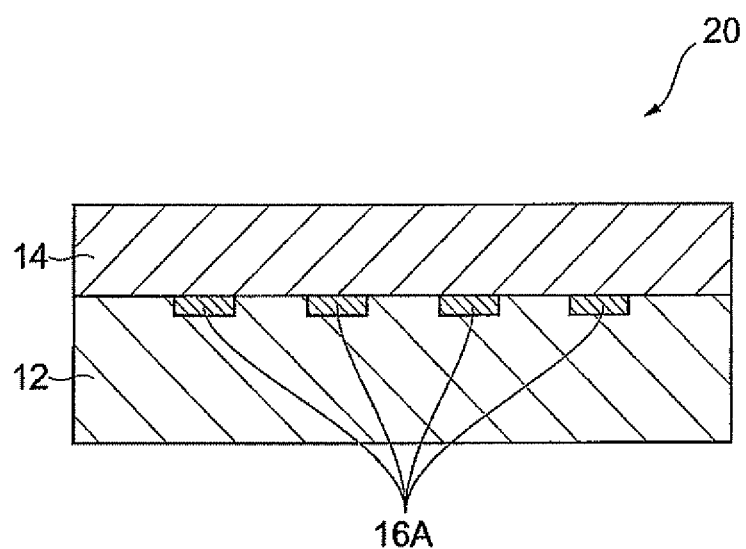
FIG. 5 is a sectional view of a dielectric device 20 which is a modified example of the dielectric device 10 in accordance with the embodiment.

For example, while the above-mentioned embodiment explains the fact that the metal oxide regions 16 having their surface parts located on the surface of the substrate 12 are preferably formed by oxidizing the metal contained in the substrate 12, the metal oxide regions 16 may be made of an oxide of a metal different from that contained in the substrate 12. FIG. 5 is a sectional view of a dielectric device 20 in which metal oxide regions 16A are made of an oxide of a metal different from that contained in the substrate 12. When the metal contained in the metal oxide regions 16A differs from that contained in the substrate 12 as such, the dielectric device 20 cannot be made by the above-mentioned method of manufacturing the dielectric device 10, but the following method, for example. That is, the substrate 12 is provided with recesses for placing a metal oxide, and then the metal oxide is buried in the recesses, so as to form the substrate 12 having a surface including the surface parts of the metal oxide regions 16A. Thereafter, the oxide dielectric layer 14 is formed on the surface of the substrate 12, whereby the dielectric device 20 can be obtained.

The metal oxide regions 16 having their surface parts dotted like islands on the surface of the substrate 12 may be formed before laminating the oxide dielectric layer 14 on the surface of the substrate 12, and then the oxide dielectric layer 14 may be disposed thereon.

EXAMPLES

The present invention will now be explained in further detail with reference to examples and a comparative example, but will not be limited to the following examples at all.

Making of Dielectric Device and Thin-Film Capacitor of Example 1

Figure 6:
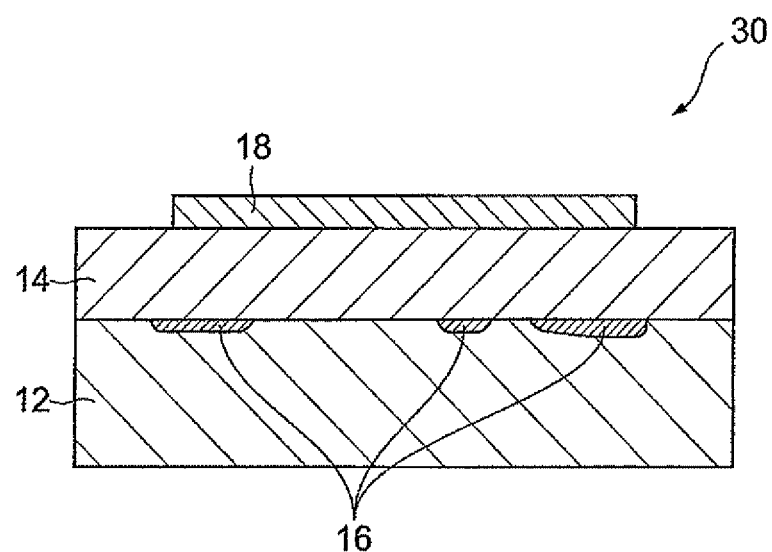
FIG. 6 is a sectional view of a thin-film capacitor 30 made by using the dielectric device 10 in accordance with the embodiment

The dielectric device 10 illustrated in FIG. 1 and a thin-film capacitor 30 having the structure illustrated in FIG. 6 were made by the following method. First, a surface of an Ni foil having a thickness of 30 µm employed as a metal foil was treated with CMP so as to be regulated. Subsequently, using the Ni foil as the substrate 12, a $BaTiO_3$ solution was applied to its surface by spin coating, so as to form the dielectric film 14a. At this time, the concentration of the solution was 0.6 M/L, while the rotating speed was 3000 rpm. After being applied, the solution was heated for 1 min on a hot plate heated to 120° C., so as to be dried.

Thus obtained product was subsequently heated for 10 min in the air atmosphere at 380° C., so as to pyrolyze organic matters (by calcination). The resulting product was then heated for 30 min at 900° C. in a vacuum atmosphere at $10^{-3}$ Pa, so as to be crystallized, whereby an oxide dielectric layer having a thickness of 50 nm was made. The foregoing processing (coating, calcination, and crystallization in sequence) was repeated six times, whereby the multilayer body 15 including the oxide dielectric layer 14 having a thickness of 300 nm was obtained.

Next, the multilayer body 15 was heat-treated for 10 min at 390° C. in the air atmosphere (first step) and then for 30 min at 900° C. in a vacuum atmosphere (second step), so as to yield the dielectric device 10 in accordance with Example 1. A cross section of the dielectric device 10 was processed with a focused ion beam (FEB) and observed through an SEM, whereby no structure having a rough surface was found on the surface part of the oxide dielectric layer 14 and the surface of the substrate 12.

Then, an upper electrode 18 made of copper (Cu) having a diameter of 1 mm was formed on a part of the upper side of the dielectric device 10 by sputtering, whereby the thin-film capacitor 30 of Example 1 was obtained.

Making of Dielectric Devices and Thin-Film Capacitors of Examples 2 to 6 and Comparative Example 1

Dielectric devices and thin-film capacitors of Examples 2 to 6 and Comparative Example 1 were made as in Example 1 except that the temperature and time for the heat treatment in the air atmosphere in the first step were changed as listed in Table 1.

Evaluation: Occupancy by Metal Oxide Regions

The oxide dielectric layers laminated on the upper side of the dielectric devices of Examples 1 to 6 and Comparative Example 1 were removed with an etchant. Thereafter, the substrate surface was observed through the SEM, the area of the metal oxide regions in a predetermined area of each substrate surface was measured by image processing, and the occupancy by the metal oxide regions (the ratio of S1 to S0) was determined.

Evaluation: Adhesion

Adhesion was measured in each of the dielectric devices of Examples 1 to 6 and Comparative Example 1. The measurement was carried out by a scratching method with an ultrathin-film scratch tester (type: CSR-02) of Rhesca Corporation. In the scratching method, as has publicly been known, a hard indenter having a fixed radius of curvature was pressed against a surface of a film to be measured and caused to scratch the surface of the film while increasing the load applied to the indenter, and a load value at which the film was destroyed (e.g., the film was peeled of from a base) was determined. This load value has been called "critical peeling load value".

The adhesion strength (critical peeling strength) of the film was calculated by using the critical peeling load value. Specifically, the adhesion strength F of the film was calculated as the maximum stress acting on a peripheral part of an impression formed by the indenter according to the following equation (1). Here, W is the critical peeling load value, R is the radius of curvature of the indenter, and H is the Brinell hardness of the base.

[Math. 1]

$$F = \frac{H}{\sqrt{\frac{\pi R^2 H}{W} - 1}} \quad (1)$$

Evaluation: Electric Characteristics

As electric characteristics, capacitance density (C/A), a leakage characteristic, and dielectric loss were measured in each of the dielectric devices of Examples 1 to 6 and Comparative Example 1. The capacitance density was defined by (capacitance of the thin-film capacitor 30)/(area of the electrode 18). The leakage characteristic was represented by the current density of the leakage current occurring when a voltage of 3 V was applied between the lower electrode (i.e., the substrate 12) and upper electrode 18 of the thin-film capacitor at room temperature. The capacity and dielectric loss were measured by an LCR meter (HP4284A) under the condition of 1 kHz-1 Vrms at room temperature of 25° C.

Results

Table 1 lists the manufacturing conditions and evaluation results of the dielectric devices and thin-film capacitors of Examples 1 to 6 and Comparative Example 1.

TABLE 1

| | Manufacturing condition | | | | | | |
|---|---|---|---|---|---|---|---|
| | Heat treatment temp. (° C.) | Treatment time (min.) | Occupancy (%) | Critical peeling strength (mN) | C/A ($\mu F/cm^2$) | Dielectric loss (tanδ) | Leakage current ($A/cm^2$) |
| Comparative Example 1 | 380 | 10 | 0 | 10 | 4.5 | 0.04 | $6.1 \times 10^{-7}$ |
| Example 1 | 390 | 10 | 2 | 14 | 4.8 | 0.04 | $3.5 \times 10^{-7}$ |
| Example 2 | 400 | 10 | 7 | 16 | 4.9 | 0.05 | $4.2 \times 10^{-7}$ |
| Example 3 | 420 | 10 | 20 | 18 | 4.7 | 0.06 | $3.1 \times 10^{-7}$ |
| Example 4 | 440 | 10 | 30 | 19 | 3.8 | 0.07 | $4.7 \times 10^{-7}$ |
| Example 5 | 460 | 10 | 40 | 21 | 3.5 | 0.08 | $2.8 \times 10^{-7}$ |
| Example 6 | 460 | 30 | 50 | 21 | 2.6 | 0.11 | $3 \times 10^{-6}$ |

As represented by Table 1, the critical peeling strength was seen to be higher in Examples 1 to 6 than in Comparative Example 1. In particular, it was proved that the dielectric devices and thin-film capacitors in accordance with Examples 1 to 5 inhibited the C/A, dielectric loss, and leakage current from deteriorating, while having high critical peeling strength, thereby yielding high adhesion at interfaces and exhibiting favorable electric characteristics.

What is claimed is:

1. A dielectric device comprising:
a substrate made of a metal; and
an oxide dielectric layer mounted on a surface of the substrate,
wherein the surface of the substrate has one or more metal oxide regions distributed like an island that is surrounded by the metal of the substrate,
the metal oxide regions are formed to infiltrate into the substrate from the surface thereof,
the metal oxide regions are made of an oxide of the metal of the substrate, and
the oxide dielectric layer is in close contact with the substrate through the metal oxide regions, wherein a ratio of S1 to S0 is 2 to 40% when referring to S1, S1 being defined as an area of an interface between the metal oxide regions and the oxide dielectric layer, and S0 being defined as an area of an interface between the substrate and the oxide dielectric layer.

2. A dielectric device according to claim 1, wherein the metal oxide regions are formed by oxidizing the metal constituting the substrate.

3. The dielectric device according to claim 1, wherein the metal oxide regions are made of an oxide of the metal of the substrate, the metal of the substrate is nickel, copper, platinum or an alloy thereof.

4. The dielectric device according to claim 1, wherein the metal of the substrate is nickel or an alloy thereof.

5. The dielectric device according to claim 1, wherein the metal oxide includes at least one metal oxide selected from the group consisting of a nickel containing oxide, a copper containing oxide, a platinum containing oxide, a palladium containing oxide, an iridium containing oxide, a rhodium containing oxide, a ruthenium containing oxide, an osmium containing oxide, a rhenium containing oxide, a tungsten containing oxide, a tantalum containing oxide, and a silver containing oxide.

6. The dielectric device according to claim 1, wherein the metal oxide includes at least a nickel containing oxide.

7. The dielectric device according to claim 1, wherein the metal oxide includes at least a copper containing oxide.

8. The dielectric device according to claim 1, wherein the metal oxide includes at least a platinum containing oxide.

* * * * *